United States Patent [19]
Gale et al.

[11] 3,800,895
[45] Apr. 2, 1974

[54] VEHICLE WEIGHING DEVICE WITH A BALANCED ELECTRICAL BRIDGE

[76] Inventors: Lee G. Gale, P.O. Box 916, Whittier, Calif. 94508; Donald V. Savage, 3133 Cork Ln., Costa Mesa, Calif. 92626

[22] Filed: June 19, 1972

[21] Appl. No.: 264,159

[52] U.S. Cl.................. 177/136, 177/211, 323/75 N
[51] Int. Cl....... G01g 19/08, G01g 3/14, G05f 3/00
[58] Field of Search.......................... 177/136–140, 177/211; 323/75 N

[56] References Cited
UNITED STATES PATENTS

| | | | |
|---|---|---|---|
| 3,495,159 | 2/1970 | Smith | 323/75 N UX |
| 3,443,652 | 5/1969 | Yideon | 177/136 |
| 3,283,838 | 11/1966 | Fetlerman et al. | 177/136 X |

*Primary Examiner*—George H. Miller, Jr.

[57] ABSTRACT

A weighing device particularly suited for vehicles, comprising strain gauges placed on a structural member of a vehicle, such as an axle of a truck in optimum orientation thereto, to compensate for certain inclinations of the vehicle when it is being weighed. The vehicle weighing device comprises strain gauges placed in a unique configuration on special mechanisms, and on the axles of a vehicle positioned laterally and angularly with respect to each other. The strain gauges are connected to and form a part of a constant current cross balanced bridge circuit which forms a portion of this invention. The circuit incorporates certain amplifiers analogous to operational amplifiers, and balancing techniques in a configuration creating a novel balanced bridge. Thus, this invention comprises a novel balanced bridge configuration and a novel weighing device and forms a new circuit and strain gauge combination, as well as mechanisms for optimum utilization of the gauges.

5 Claims, 16 Drawing Figures

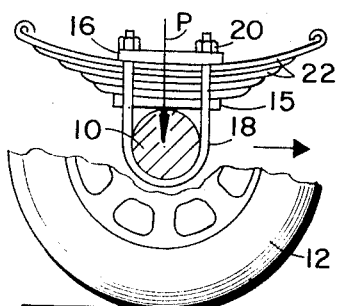
FIG. 1
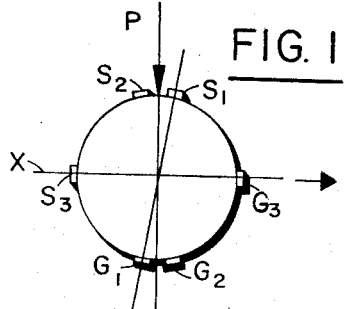
FIG. 2
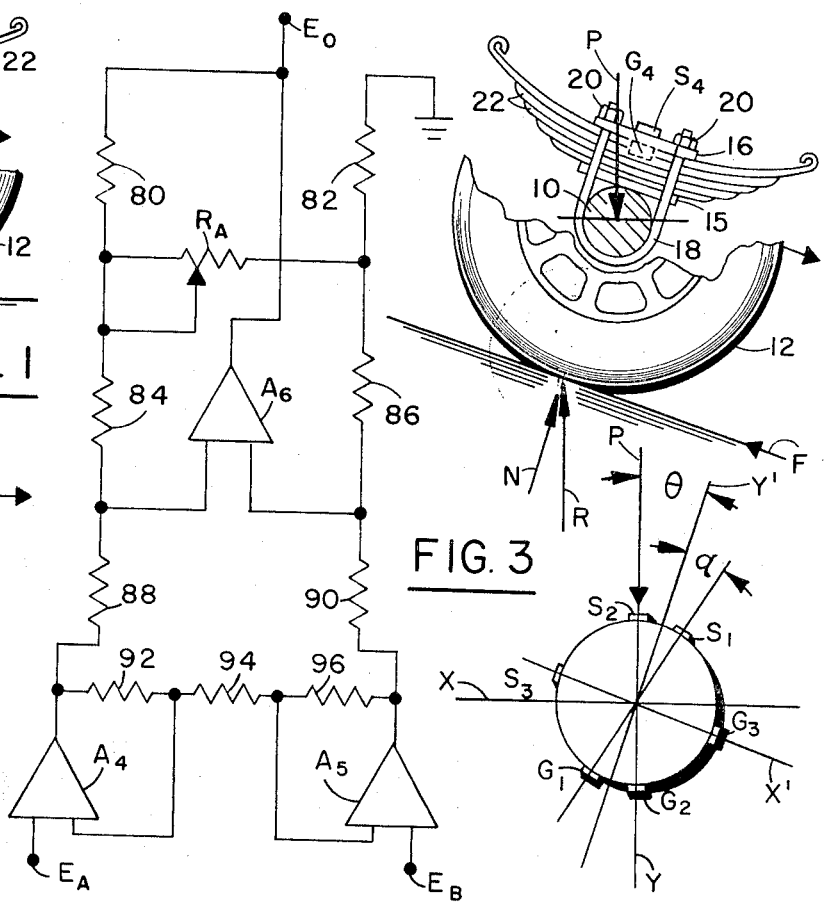
FIG. 3
FIG. 6
FIG. 4
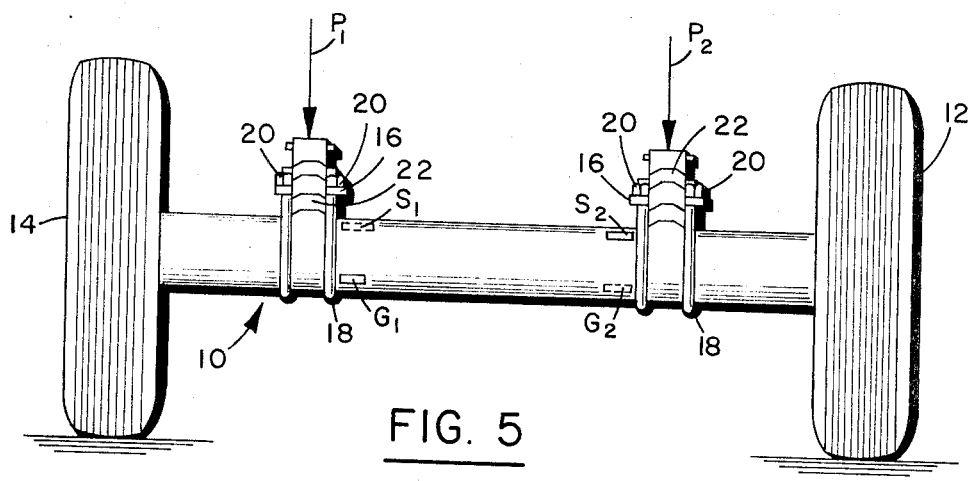
FIG. 5

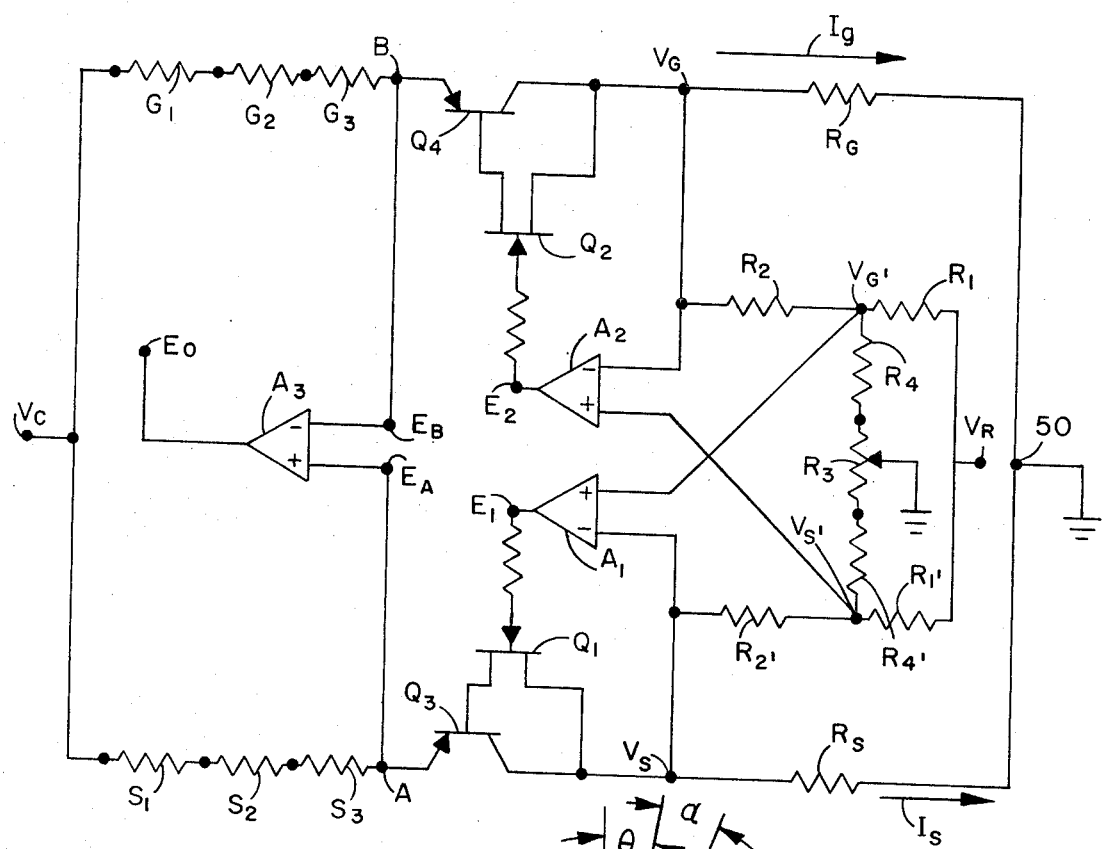
FIG. 7
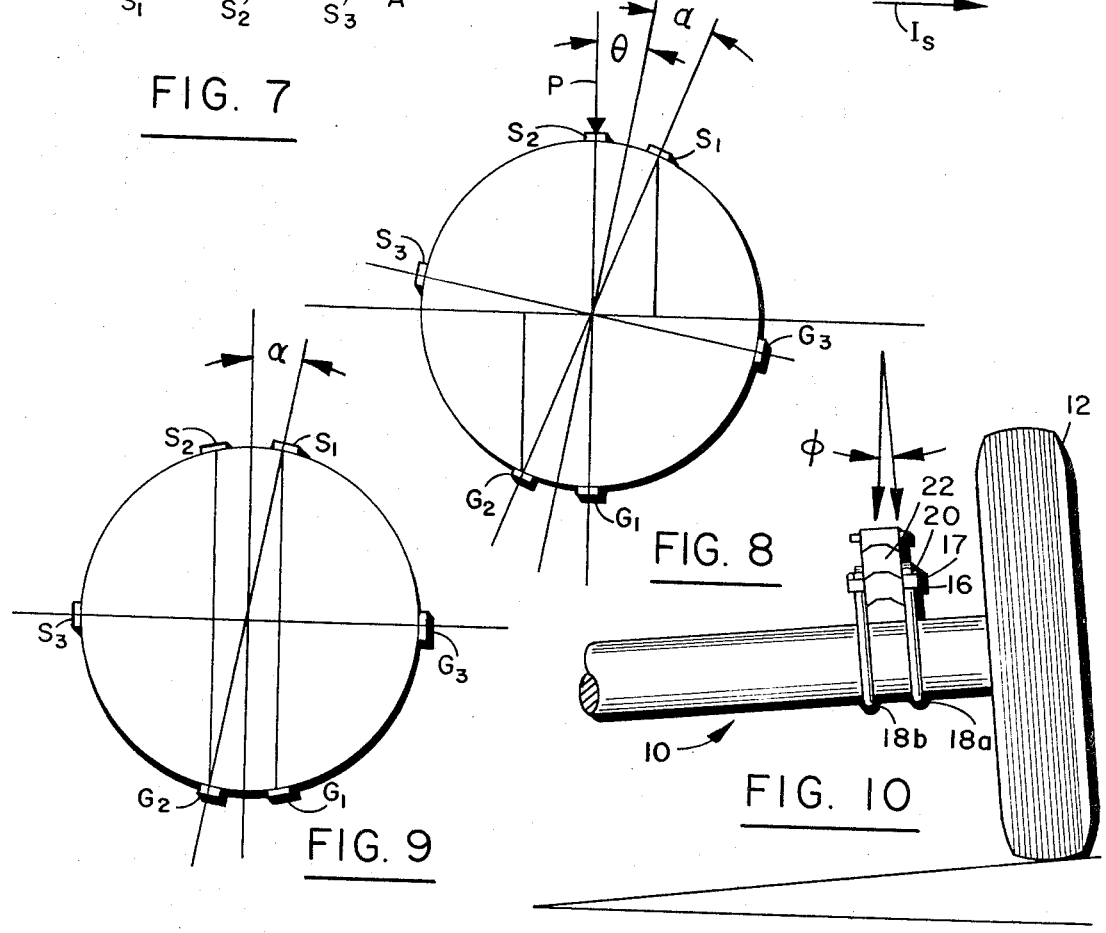
FIG. 8
FIG. 9
FIG. 10

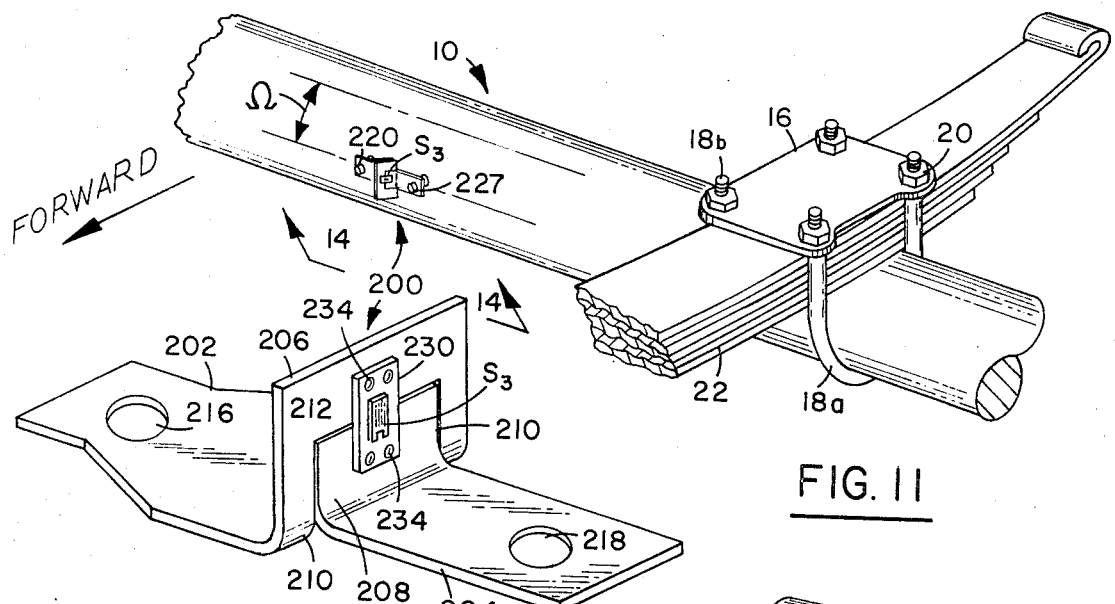
FIG. 11
FIG. 12
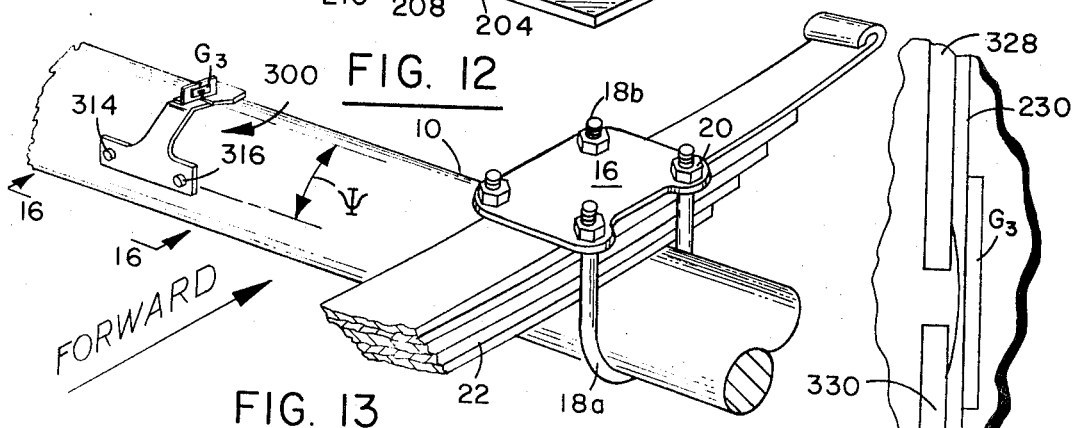
FIG. 13
FIG. 14
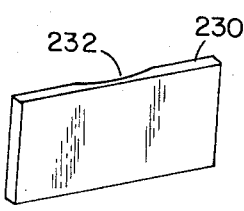
FIG. 15
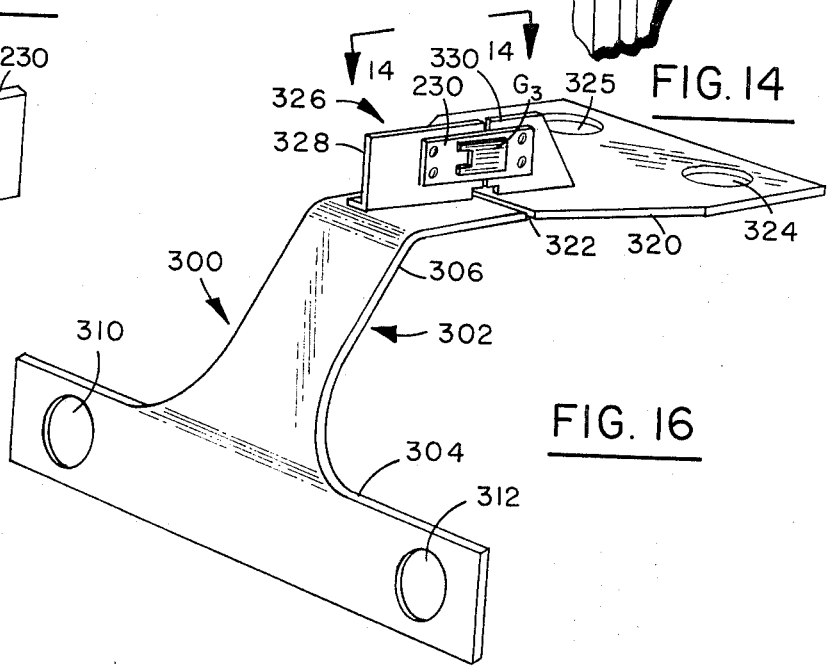
FIG. 16

VEHICLE WEIGHING DEVICE WITH A BALANCED ELECTRICAL BRIDGE

BACKGROUND OF THE INVENTION

1. Field of the Invention

The field of this invention lies within the electrical strain gauge art as applied to the weighing of vehicles.

2. The Prior Art

The Problem

A long standing problem in the trucking industry has been the lack of a method to accurately determine the weight of a vehicle load. The actual weight of a vehicle is generally known, but the load thereon for over the highway hauling is generally not known until the entire vehicle is weighed. Of course, the major reason for weighing a vehicle is that if it is not filled to maximum payload, the economic results can be detrimental to an operator. Furthermore, if the gross weight of the truck is higher than it should be, the operator will meet with certain fines.

Several mechanical and electrical methods have been proposed to determine vehicle axle loads. In general, the methods overlook changes which are inherent with age, and they are subject to certain error because of inadequate mechanical and electrical systems.

Many of the prior art devices rely upon Wheatstone bridges in their electrical scheme. However, the non-linearity of a Wheatstone bridge precludes its use as an accurate automatic system for weight determination. This is due to the fact that a null point cannot be reached adequately in all portions of the bridge. Also, Wheatstone bridge instrumentation systems are affected by small resistance changes in the wires that contact the strain gauges or other resistances in the systems. Efforts have been made to overcome the foregoing deficiencies by the use of a Kelvin bridge. However, the use thereof is expensive and the problem still exists to some degree.

Another problem of the prior art is that it has not concerned itself with extreme sensitivity and stability. This is due to the non-linearity characteristics of the circuits, as well as the circuit interaction and temperature sensitivity.

Many of the prior art devices weigh a vehicle to some degree of accuracy. However, they do not compensate for an uneven distribution of loads, especially if those loads are not on a horizontal plane. This invention generally relates to the accurate measurement of the strain exhibited by a structural member and more particularly, the strain exhibited by a load bearing structure of a vehicle. The invention, while it is general and not limited to any specific application of the stress-strain principal, is particularly well suited to the measurement of strains in transversely loaded beams, like a truck axle.

The accurate determination of the load borne by a vehicle employed as a common carrier has been a severe problem. It must be recognized that the load determination requires a system having substantial accuracy which the prior art did not accomplish. Furthermore, the system should be to some degree automatic.

When one leg of a Wheatstone bridge is made the variable element, such as a strain gauge, the response of the bridge is non-linear, and the sensitivity is low. This problem has defied solution until this invention.

If all four legs of the bridge are made variable elements, the non-linearities can be improved. However, the improvement can only be to the extent that each of the legs changes in a like amount quantitatively. In other words, a Wheatstone bridge must initially be balanced to a null condition which requires at least one of the legs of the bridge have a resistance in parallel with it which will introduce non-linearity errors.

Also, as previously stated, the resistance of the interconnecting wires causes a problem. Additionally, the strain gauge elements of the prior art could not be placed on a vehicle to compensate for errors that occur when a vehicle is loaded on a non-horizontal surface. As a consequence, none of the electronic systems discussed below, have made any provisions for correcting errors that occur when the vehicle is loaded on a non-horizontal surface.

THE PRIOR ART SOLUTIONS

The prior art solutions relating to the foregoing problems, provided strain gauge weighing devices and circuits incorporated in certain patents. Specifically, the patented prior art incorporated strain gauges positioned on the upper and lower portions of axles to measure both tension and compression. The gauges were connected to a Wheatstone bridge so that changes in the tension and compression were algebraically additive to give increased sensitivity. However, it was found that in such prior art devices that the readings were not accurate when the vehicle was longitudinally and/or laterally inclined. It is for such reasons that the prior art devices have not effectively incorporated a commercially responsive practical means of weighing vehicles by strain gauges.

Some prior art discloses means for weighing a trailer when it is in a standing position and not attached to a tractor. However, it only provides for means of weighing a trailer when it is being loaded or is in a relatively static position on a horizontal surface.

The prior art has incorporated such things as spring means interposed between a trailer body and the structural members threof in order to compensate for the loading effect on the trailer. In other words, certain systems utilizing straing gauges incorporate compensation means mechanically extrinsic to the particular strain gauge and electrical circuit incorporated therewith. Such strain gauges have been mounted to incorporate certain moments of an axle, without accounting for inaccuracies of axle movement as it relates to its wheel. As a consequence, these systems have not provided accurate readings for indicating the weight on the axle.

The prior art does not provide for compensation of brake torque affecting the positioning of the strain gauges, so that such devices do not read out an adequate weight of the trailer. Furthermore, in some cases, the strain gauges are placed wherein they attempt to measure pure shear as opposed to moment and the output of the device does not effectively read the proper weight of the truck which was being weighed.

Other teachings of the prior art show a plurality of electromechanical transducers with certain floating mounts to permit limited vertical movement between the body and the frame of the vehicle to be weighed. Such art is directed to means for mounting the strain gauges to permit limited longitudinal and transverse movement of the body and is not directed to the actual placement of the strain gauges in the proper place nor a proper electrical readout means.

Some prior art devices are directed to systems having spacers, shims, and plates to compensate for the placement of the strain gauges in a manner wherein the entire strain gauge is mechanically compensated for as to its placement. In these cases, an effective weighing is not accomplished by virtue of the fact that the mechanical movement cannot be compensated for.

Still other teachings of the prior art show forklift trucks with forks having strain gauges incorporated on the length thereof. Such teaching cannot be effectively incorporated in a workable vehicle weighing device as this particular application teaches.

This invention overcomes the foregoing deficiencies of the prior art by incorporating a controlled balance bridge circuit which inherently overcomes the linearity problems of the prior art circuits. Furthermore, the balanced bridge circuit of this invention serves to provide a truly meaningful readout on the weight of a truck.

In addition to the foregoing circuitry advantages of this invention, it also incorporates the placement of strain gauges on an axle in an optimized manner to compensate for lateral as well as longitudinal incline of the trailer while it is being weighed.

The electronic portion of this invention accommodates most vehicle configurations and employs a simple gain adjustment for each axle, such that any vehicle configuration may be compensated for prior to the actual combining of its component parts. Furthermore, the invention eliminates the difficulty associated with a Wheatstone bridge, and is adjustable to accommodate most of the resistance strain gauges that are known today. Also, the electronic system is substantially insensitive to aging and ambient temperature changes.

SUMMARY OF THE INVENTION

In summation, this invention comprises a new and novel strain gauge orientation and system for weighing a vehicle. Additionally, it comprises a combination of strain gauges in a unique and novel circuit which effectively balances the strain gauge configuration to provide electronically accurate readings.

More particularly, this invention encompasses the placement of strain gauges on beams subject to a bending moment for the accurate measurement of the weight or loading on the beam. The specific application of the invention is directed toward a vehicle weighing device. The device places strain gauges at optimum angles on an axle of a truck and on uniquely constructed mechanisms which are also mounted on the axle of a truck to compensate for angular displacement of the load on the axle relative to the two mutually perpendicular horizontal major axis of the axle.

When the vehicle is on a non-horizontal surface, whether it be a longitudinally non-horizontal or a laterally non-horizontal surface, the placement of the strain gauges of this invention substantially compensate for the angular displacement of the vehicle. The axles of the vehicle when angularly displaced, militate against an accurate reading of the load on the axle in the manner prescribed by the prior art. This invention allows an inclination of an axle in a longitudinal or lateral manner to be compensated for by virtue of the placement of the strain gauges.

In addition to the foregoing unique placement of the strain gauges and mechanisms provided by this invention, the invention incorporates a unique circuit. Specifically, the invention incorporates the use of a balanced bridge configuration. The balanced bridge configuration allows a constant current to be conducted through the respective resistors or strain gauges so that a linear reading can be provided. The instrumentation and the balanced bridge configuration of this invention permits a substantially more accurate reading than was capable in the prior art regardless of the placement of the strain gauges.

The foregoing combination of the electronic circuitry and the strain guages allows a substantially accurate reading of the load on a vehicle, and more particularly a vehicle axle. Thus, the invention reisdes in the strain gauge placement, the mechanism and the circuitry, either singularly or in combination.

BRIEF DESCRIPTION OF THE DRAWINGS

The invention will be more clearly understood by reference to the following description, taken in conjunction with the accompanying drawing wherein:

FIG. 1 is an elevation view of an axle of a vehicle on a horizontal surface, with the wheel and spring arrangement shown;

FIG. 2 is a schematic showing of the axle and the strain gauges applied thereto for the practice of this invention when the vehicle is in the position shown in FIG. 1;

FIG. 3 is an elevation view of an axle, wheel and spring arrangement when the vehicle is in a longitudinally displaced relationship from the horizontal;

FIG. 4 is a schematic view of the axle with the strain gauges of this device for practicing the invention when the axle is in the position of FIG. 3;

FIG. 5 is a front elevation view of the axle with the strain gauges of this invention placed thereon along with the attendant spring and wheel supports;

FIG. 6 is a schematic view of the amplifiers utilized with the balanced bridge circuit of this invention;

FIG. 7 is a schematic circuit diagram of the balanced bridge of this invention;

FIG. 8 is a diagramatic representation of the axle and the strain gauges of this invention when longitudinally displaced;

FIG. 9 is a diagramatic representation of the strain gauges on the axle of this invention;

FIG. 10 is a fragmented elevation view of the axle spring and wheel arrangement when the vehicle is laterally displaced;

FIG. 11 is a perspective fragmented view showing of an axle and spring retainer assembly with a mechanism to compensate for longitudinal displacement for purposes of practicing this invention;

FIG. 12 is a detailed showing of the mechanism shown attached to the axle of FIG. 11 along lines 12—12 thereof;

FIG. 13 is a perspective fragmented view of a mechanism to compensate for lateral displacement;

FIG. 14 is a view along lines 14—14 of FIG. 16;

FIG. 15 is a detailed perspective view of the strain gauge mounting means of this invention; and, FIG. 16 is a view of the mechanism shown in FIG. 13 in greater detail and taken along lines 16—16 thereof.

DESCRIPTION OF THE PREFERRED EMBODIMENTS

Strain Gauge Placement

Looking more specifically at FIGS. 1, 2 and 5, a series of strain gauges are shown mounted on an axle 10 of a vehicle such as a truck trailer. The axle 10 is supported by two wheels having tires 12 and 14. The vehicle and more specifically, the trailer is supported on a leaf spring support shackled to the axle 10. The spring support comprises a spring base plate 15 and a spring retention plate 16. The plates 15 and 16 serve to secure leaf springs 22 by means of shackles or U-bolts 18 having nuts 20. The spring section comprises a series of leaf springs 22 which are generally shown in greater detail in FIGS. 1 and 3.

Looking more particularly at the axle in FIG. 5 strain gauges are shown positioned as follows. For easy reference, the strain gauges will be referred to with alphabetically numbered sequential references.

The strain gauges can be affixed to the axle directly in any suitable manner. Furthermore, they can be secured to plates or other members that are then directly affixed to the axle 10. The strain gauges can be protected by covers or placed in containers. The most important consideration is that the gauge be affixed in a manner whereby they can be displaced by flexure of the axle 10.

Strain gauges S-1 and S-2 are shown in angular displacement from each other as can be seen in FIG. 2 as well as FIG. 5 showing the phantom placement of strain gauge S-1. Strain gauges G-1 and G-2 are shown on the axle wherein strain gauge G-2 is in angular displacement from strain gauge G-1 as shown in FIG. 2 and the phantom showing of FIG. 5. Two strain gauges G-3 and S-3 are shown in FIGS. 2 and 5 with strain gauge G-3 shown in phantom mounted on the mechanism shown in FIGS. 13 and 16 and in angular displacement 180° from strain gauge S-3 mounted on the mechanism shown in FIGS. 11 and 12.

The placement of the foregoing strain gauges compensates for errors that would otherwise occur when an axle is angularly displaced from the horizontal. The placement of the strain gauges as will be described, can be in any suitable angular relationship for purposes of measuring the strain on the axle. However, the showing herein is of the most practical angular displacement known to the inventor.

FIGS. 3, 4 and 8 show a longitudinally inclined loading position of a vehicle axle. Thus, the strain gauges have been canted in angular relationship from the general horizontal loading condition shown in FIG. 9. The placement of the strain gauges and their electrical interconnection in the bridge circuit effectively compensate for certain angular inclinations of the axle 10 so that a true registration can be had of the actual loading on the axle 10. In this manner, the load on the axle 10 can be added to the loading on the other axles to resolve the total loading on the trailer as well as each axle.

Strain gauges G-3 and S-3 are respectively placed on the mechanisms affixed to the axle as shown in FIGS. 11 through 16. The placement compensates for lateral and longitudinal displacement or incline of the axle as will be described.

Strain Gauge Configuration for Optimum Operation

The foregoing placement of the strain gauges and the electrical connections results substantially in compensations for errors that occur when a vehicle is loaded on a non-horizontal surface. This is true whether the non-horizontal surface is with respect to the longitudinal relationship of the trailer or the lateral relationship of the trailer. When the circuits which have been disclosed in FIGS. 6 and 7 are utilized, the strain gauges operate in an optimal manner.

The constant current controlled balance bridge circuit of this invention is such that it allows constant current to flow through the legs of the bridge. In other words, the strain gauges in the S series, namely strain gauges S-1, S-2, and S-3 are such that they will have the same current flowing through them as the strain gauges G-1, G-2 and G-3.

As can be seen, the combination of the strain gauges S-1, S-2, and S-3; G-1, G-2, and G-3 are provided with a controlled current source so that a stable constant current is maintained through the foregoing strain gauge combination even when the resistance of the combinations changes in response to flexure of the axle. Inasmuch as the supply voltage Vc is at a low point of impedance and the configuration is such that the amplifier is insensitive to common mode levels, the outward voltage level is zero as long as the resistance of the strain gauges and the strain gauge combination currents are equal.

Thus, the useful but difficult to obtain result is that the voltage across the S and G combinations of strain gauges is a linear function of their resistance values and the current through them. In other words, with a constant current condition being satisfied, the resistance of the interconnecting wires and switch contacts will not affect the circuit operation. Consequently, a linear readout will be given as to the resistance values of the system.

The strain gauges S-1 and S-2 and G-1 and G-2 have been placed at equal angles $\alpha$ from a vertical line generally at 90° from the horizontal. The angle $\alpha$ of the strain gauges from the vertical line should be set such that it is equal to the maximum anticipated angle of longitudinal displacement away from the horizontal that the vehicle is to be loaded upon.

It can be shown that the neutral axis which passes through the centroid of the cross sectional area of a beam is generally normal to the force that is perpendicular to the axis of the beam. For this reason, when a beam, in this case, the axle 10 is on a horizontal surface, the force P downwardly on the axle 10 is vertical. In such a case, the neutral axis coincides with the horizontal line "X" which has been indicated in the drawings. The loading in this case is such that the strain gauges S-1 and S-2 are under compression and the strain gauges G-1 and G-2 are generally under tension. Thus, the change in the distance that the strain gauges are from the neutral axis when the vehicle is loaded on a non-horizontal surface must be compensated for and this is done by virtue of the circuitry and the placement of the strain gauges S-3 and G-3 on their respective mechanisms.

As an aside, the change in the resistance of a metal foil strain gauge under tension is positive. In other words, in such a case the resistance is increased.

The change in the resistance of a metal foil strain gauge under compression is negative. In this case, compression would thus provide a decrease in the resistance.

With this in mind, the resistance of the configuration of S–1 and S–2 decreases and the resistance of the configuration of G–1 and G–2 increases when an increase in the loading is applied to the axle 10. Since the strain gauges are connected in the control of bridge circuity as shown in FIG. 7, the following happens. When the voltage of $E_a$ increases, and $E_b$ decreases in proportion to an increase in the mechanical load on the axle 10, the output of the amplifier changes from zero to some specified $E_o$.

FIGS. 3, 4 and 8 show an axle in a cross sectional view of a trailer axle being loaded on a non-horizontal surface. Specifically, the load is on a longitudinally (i.e. front to back) non-horizontal surface, wherein the axle is rotated through an angle $\theta$ from the horizontal as indicated by the line Y' and the vertical load vector P. The neutral axis which is shown by the line X is still horizontal but exists at the angle $\theta$ away from its original relationship to the placement of the strain gauges. In other words, the neutral axis is always perpendicular to the normal force.

By reason of the foregoing, $E_o$ will not change as the longitudinal angle $\theta$ changes. In other words, the gauges compensate for changes in the loading P on the axle due to angular rotation of the axle.

The prior art did not cover this subject. Thus, the strain gauges placed on axles resulted in a voltage from the Wheatstone bridges thereof that was directly proportionate to the cosine of the angle $\theta$ of inclination. In contradistinction thereto, this invention incorporates a strain gauge placement such that it substantially compensates for such displacement.

The current through the S and G combinations of strain gauges should be held constant and equal if the system is to function properly. Effectively, the strain gauges are connected as load resistors in a differential amplifier. The differential amplifier is effectively located as shown by its relationship to the amplifiers A–1, A–2 and A–3.

The circuit shown in FIGS. 6 and 7 performs the basic functions necessary for the unique operation of this invention. More particularly, the circuit of FIG. 6 is incorporated in the circuit of FIG. 7 as the amplifier A–3.

The first function of the circuits of FIGS. 6 and 7 is to maintain a constant current through the S combination of strain gauges and the G combination of strain gauges. The current through the respective gauges shall be designated $I_s$ for the current through the S strain gauges and $I_g$ for the current through the G strain gauges.

The object of the circuitry is to maintain $I_s$ equal to $I_g$ and to provide the capability to adjust the magnitude of $I_s$ and $I_g$ by a manual articulation of the reference voltage $V_R$. Another object is to sense the differential voltage changes that occur at points A and B which are shown in the drawing as the terminal point of $S_3$ and $G_3$ respectively. The sensing is in response to changes of resistance in the strain and amplify this particular voltge and apply it to a readout device. The readout device can be either a digital readout that reads a particular voltage and then applies it to a digital display, or it can also be an analog type of readout such as a d'Arsonval movement responsive to the amplified voltage.

The primary power for the circuit is derived from the 12 volt battery system of the vehicle. The 12 volt DC power is applied to a DC to DC converter where it is transformed into two isolated 22 volt DC supplies.

The 22 volt DC power is then applied to two temperature stabilized high gain closed loop series voltage regulators. The voltage regulators provide ± 15 volt outputs, isolated from ground that remain within a substantial degree of accuracy of 15 volts. The ± 15 volt supply is connected to the common point between S–1 and G–1, namely the point Vc. A current path exists through the series combination of strain gauges in the S series and then through the transistors Q–1 and Q–3. The current then flows through RS to a suitable ground designated ground 50.

A similar current path exists through the series combination of strain gauges in the G series, through the transistors Q–2 and Q–4, and finally through the resistance $R_g$ to the ground point 50.

The two foregoing current paths are parallel and fed from a common power supply. Thus, they form a circuit that is commonly called a bridge circuit. The nodes that exist at equal impedance levels on the opposite legs on the bridge will be at equal voltages. Sepcifically, points A and B are two such points. When the impedance from point A or point B changes with respect to the plus 15 volt supply (Vc), the voltages at these points will change and the amplifier A–3 will amplify the changes. In this manner, the readout device which can be in the form of a meter, will indicate the particular voltage change which is an analog of the load on the axle.

The transistor combinations of Q–1 and Q–3, on one leg of the bridge and Q–2 and Q–4 on the other leg of the bridge act as variable impedances. The variable impedances are statically balanced by a balancing resistor and are controlled dynamically by the amplifiers A–1 and A–2.

The circuit interconnections are such that Q–1 and Q–3 are forced by the amplifier A–1 to compensate for the resistance changes that occur in the S strain gauge combination. Transistors Q–2 and Q–4 are forced by amplifier A–2 to compensate for resistance changes that occur in the G strain gauge combination. It should be noted that the transistors may be of any suitable type as long as appropriate gain and biasing is taken into consideration. In this particular instance, the amplifiers can be of the operational type well known in the art.

The resistors RS and RG are temperature stabilized fixed resistors that develop the voltages $V_s$ and $V_g$ to be applied to the amplifiers A–1 and A–2 set the level of $I_s$ and $I_g$.

The resistances R–1 and R–2 serve as voltage dividers and allow $V_s'$ and $V_g'$ to be a partial function of $V_r$ in order to set the limit of $I_s$ and $I_g$ and a partial function of $V_s$ and $V_g$, to maintain "cross balanced" control of $I_s$ and $I_g$.

The Circuit Operation

Current flowing through the S combination develops a voltage $E_a$ at point A. Current flowing through the G combination develops a voltage $E_b$ at point B. $R_3$ is then adjusted such that $E_a$ is equal to $E_b$.

The differential input to A–3 which is shown as the amplifier of FIG. 6, is balanced and $E_o$ is equal to 0. Resistor $R_a$ is a gain potentiometer for establishing an appropriate gain in the circuit. At this point the vehicle can be loaded. The S combination will decrease in resistance and the G combination of strain gauges will increase in resistance. As a consequence, $E_a$ will increase and $E_b$ will decrease. $E_o$ will be proportional to the difference and will be displayed to the operator on a meter as the indication of the load.

If no other control is exercised in the circuit, $I_s$ would increase and $I_g$ would decrease and $E_o$ would not be a linear function of the load. However, the circuit causes $V_s$ across $R_s$ to increase as $I_s$ increases. Furthermore, $V_g$ across $R_g$ decreases as $I_g$ decreases. As a consequence, $V'_s$ increases as $V_s$ increases $V'_g$ decreases as $V_g$ decreases.

The voltage differential at the input to $A_1$ is such that the $A_1$ output voltage $E_1$ decreases and reduces the current through $Q_1$. The collector current of $Q_3$ is thus decreased which counteracts the original increase in $I_s$. The voltage differential at the input to $A_2$ is such that the $A_2$ output voltage $E_2$ increases and thus increases the flow through $Q_2$. The collector current of $Q_4$ is now increased which counteracts the original decrease in $I_g$.

The gains of $A_1$ and $A_2$ are quite high, therefore very small changes in $V_s$ and $V_g$ caused by small changes in $I_s$ and $I_g$ result in quite large changes in $E_1$ and $E_2$; since the changes in $E_1$ and $E_2$ are large in relation to the changes in $V_s$ and $V_g$, $I_s$ and $I_g$ are limited to small changes and are in fact held constant for all practical purposes.

Since $E_1$ is a function of $V'_g$ and $E_2$ is a function of $V'_s$; $I_s$ and $I_g$ are maintained equal to each other as well as constant.

The output amplifier consists of three high gain operational amplifiers making up the amplifier $A_3$. The amplifiers, which are operational amplifiers, making up $A_3$ have been designated $A_4$, $A_5$ and $A_6$ in FIG. 6. Biasing and gain functions are provided by the resistors numbered 80 through 96. The configuration of the amplifier provides a high common mode and high differential input impedance. As a consequence, the bridge circuit is not affected by the circuit of FIG. 6, namely that of amplifier $A_3$ in its entirety. The common mode rejection ratio of $A_3$ is very high, so that $E_o$ is affected only by the differences between $E_a$ and $E_b$ and not by their absolute values. The gain of $A_3$ can be set by adjusting $R_a$. The maximum gain necessary is approximately 1,000 which is well below the maximum capability of $A_3$. The output impedance of $A_6$ is low so that either low or high impedance readout devices can be used, such as the d'Arsonval movement previously mentioned or the digital volt meters currently used in the state of the art.

$A_4$ and $A_5$ act basically as high input impedance differential amplifier. The outputs from $A_4$ and $A_5$ are applied to $A_6$ which is a typical summing amplifier with adjustable gain. Each of the amplifiers is frequency compensated and temperature stabilized to remain within a very small range.

Since $S_1$ and $G_1$ are connected to a common point which is maintained at a constant voltage Vc:

$$E_A = Vc - I_s(S)$$
$$E_B = Vc - I_g(G)$$
$$S = S_1 + S_2 + S_3 \text{ and } G = G_1 + G_2 + G_3$$

$I_s$ is forced to be equal to $I_G$ by the amplifiers $A_1$ and $A_2$ such that the S and G subscripts may be removed:

$$I_s = I_G = I$$

It can be seen in FIG. 7 that the output voltage $E_o$ of $A_3$ which operates the readout device is as follows:

$E_o = A(E_A - E_B)$ where "A" is the gain of $A_3$
$= A(Vc - I_s \times S - Vc + I_gG)$
$= A(I_g \times G - I_s \times S)$
$= AI(G - S)$ I is set to the desired level by adjusting $V_R$.

When the vehicle is unloaded, $G = S$, $V_g$ is equal to $V_s$ and $E_o$ will be equal to 0 if there are no residual loads remaining on the vehicle and the system has been previously brought to a null condition before the vehicle was originally loaded.

Longitudinal Loading Compensation

In order to effectively cause the system to operate, the strain gauge combination must be placed on a vehicle axle such that the resistance changes in the G and S combinations that occur are correct even when the vehicle is loaded on a non-horizontal surface. As previously alluded to, the placement of the strain gauges on the special mechanisms allows for such compensation. In effect, the change in the resistance of a strain gauge is a linear function of stress on the surface on which it is mounted. Thus, an analysis of the stress will indicate how the resistance will change.

The stress on any element of a transversely loaded beam under pure bending moment is directly proportional to the perpendicular distance of that element from the neutral axis. As shown in the drawings, the strain gauges above the neutral axis are under a compressive stress and the strain gauges under the neutral axis are under a tensile stress when the vehicle is loaded. The magnitude of these stresses increases linearly with increasing perpendicular distance from the neutral axis. Thus, the portion of a truck axle between the springs as is shown can be analyzed as an elastic beam under pure bending moment. As such, it should provide the most accurate indication of the load borne by the vehicle under all loading conditions.

Three loading configurations must be considered if accurate results are to be obtained. This invention considers these three loading conditions and compensates for an odd horizontal placement of a vehicle with respect to the loading conditions. As indicated in the figures, FIGS. 1 and 2 show the loading in a horizontal position. FIGS. 3 and 4 indicate the loading in a longitudinally inclined position. FIG. 10 indicates the loading when the vehicle is in a laterally displaced position from the horizontal.

When the vheicle is in a horizontal condition as shown in FIGS. 1 and 2, the moment is constant between the spring forces at either side of the vehicle. In other words, the spring forces P–1 and P–2 as shown in the drawings, in FIGS. 1, 2 and 5 allow the moment to be constant. Thus, strain gauges S–1 and S–2 are under equal compressive stresses and G–1 and G–2 are under equal tensile stresses which are equivalent in magnitude to the compressive stresses on S–1 and S–2.

Strain gauge S–3 in FIGS. 11 and 12 has been placed on the mechanism in a definite relationship to the axle such that it only responds to longitudinal inclines. Specifically, S–3 responds in direct proportion to $K_2$/sine $\theta$/. Strain gauge G–3 in FIGS. 13 through 16 has been placed on the mechanism in a definite relationship to the axle such that it only responds to lateral inclines. Specifically G–3 responds in direct proportion to $K_3$/sine $\phi$/ where $\phi$ is the angle of lateral incline. Inasmuch as strain gauges S–3 and G–3 are not substantially stressed during horizontal loading, they contribute nothing in this instance to the electrical indication of the load.

The mechanism that responds to longitudinal incline is generally shown in FIGS. 11 and 12. The showing comprises an axle 10 having U-bolts 18a and 18b which respectively are connected to the retaining plate 16 by nuts 20. The U-bolts are shown clamping a series of springs 22 by means of the spring retainer plate 16.

Looking more particularly at the figures, a general showing is made of a mechanism 200 which comprises one of the special mechanisms of this device. The mechanism 200 is comprised of a first angle plate 202 and a second angle plate 204 implaced therein. A space within an upstanding portion 206 of the angle plate 202 receives an upstanding portion 208 of the angle plate 204. These two respective angle plates are configured so that a space is provided between them as to their upstanding portions 206 and 208. Thus, there can be some degree of movement of each upstanding portion 206 and 208 with respect to each other upon flexure of the axle 10. Specifically, a small plate 210 and 211 is provided on either side of the interfacing of the angle plates 202 and 204. Secondly, a space 212 is provided athwart the interface between the two angle plates 202 and 204. The angle plates 202 and 204 have openings 216 and 218 for purposes of utilizing bolts 220 and 222 to attach the plates generally to the horizontal or neutral axis of the axle 10.

The two respective plates 202 and 204 can be welded to the horizontal axis of the axle 10 shown in FIG. 11. The plates 202 and 204 can also be bolted or connected in any other suitable manner as long as they are in substantially affixed relationship. When referring to the horizontal axis of the axle 10, the assumption is made that the axle and the general planar relationship of the body which it supports is on the horizontal. In such a case of course, the neutral axis would be the horizontal axis.

Connected across the two respective plates 202 and 204 is a bridging plate 230 having a space or cutaway portion 232. the space 232 is generally utilized to concentrate the imparted stress of the plate 230 whereby stress can be received by a strain gauge attached thereacross. The space 232 also eliminates the requirement of substantially close tolerances. The bridging plate 230 should be of a substantially strong enough nature so that it will at least be maintained in a fixed position after it has been connected to the two respective plates 202 and 204. the bridging plate 230 can be maintained by means of fusion welds or any other particular connection which will maintain the plate in fixed relationship at its connection point. Specifically, fusion welds 234 are shown connecting the bridging plate 230 to the two respective angle plates 202 and 204.

As previously stated, the straing gauge S–3 is attached to the bridging plate 230 and connected to the circuit. The strain gauge S–3 can be connected in any suitable manner to the circuit and should be covered by a particular configuration of a container suitable for protecting the strain gauge against the elements as well as physical abuse when it is on a truck axle. However, the container or cover need not be of any particular configuration as long as it suitably covers and protects the strain gauge and the other elements connected thereto.

The mechanism shown in FIGS. 11 and 12 labeled 200 should generally be mounted on the rear of the axle 90° from the top dead center so that angle $\Omega$ is approximately 90°. Thus, as can be seen, the elements of the mechanism 200 are placed in the neutral axis and not stressed during horizontal loading.

Each segment of the rear portion of the axle 10 is in compression during downhill inclined loading and in tension during an uphill inclined loading, assuming the incline is with respect to the front and rear portion of the axle. As can be seen, the mechanism 200 is placed on the neutral axis and therefore is either in compression or tension during uphill or downhill longitudinal loading. During compression, the angle members 206 and 208 of plate 202 and 204 move toward each other. During tension, the angle members 206 and 208 move away from each other. Of course, the movement is reflected most dramatically across the space 212.

In light of the foregoing, it can be observed that movement takes place between the edges of the respective plates 202 and 204 that are interfaced in the space 212. Thus, as the movement of the plates within the space 212 takes place, it deflects the bridging plate 230 which of course causes the strain gauge S–3 to expand. This provides an appropriate indication of the strain imposed upon the axle.

As an side, an examination of the bridging plate 230 will show that it is subjected to the same loading moment during both compression and tension. The change in resistance of the strain gauge is therefore proportional to the absolute value of the Sine of $\theta$ ie.$\Delta R = K_2$/Sine $\theta$/. Thus, plate 230 by being cut out with the space 232 tends to concentrate the stress in that area. Furthermore, this cutout 232 tends to eliminate the requirement for close tolerances of the mechanism.

As has been stated, S–1 and S–2 decrease in resistance and G–1 and G–2 increase in resistance as the axle is stressed.

FIGS. 3 and 4 show the change that occurs when the vehicle is loaded on a longitudinal incline. The force $P_1$ is now resisted by two resultant forces F and N. If F and N are added vectorially, the resultant forces are colinear with P.

In the case at hand, a mechanical couple causes a torque on the axle. The torque exists only in the axle segment between the wheel and the spring, and does not substantially affect the system.

Assuming that P is the same magnitude as it was in the horizontal surface case, then the bending moment imposed on the center section of the axle will be the same magnitude as it was in the horizontal. However, in the case of longitudinal incline, the axle has been rotated as shown in FIG. 4. Also, since the axle has been rotated in relation to P and consequently the neutral axis, the strain gauges exist at different perpendicular distances from the neutral axis than they did in the horizontal. As a consequence, they are stressed at different levels than they were in the horizontal.

The change in the above stress on the strain gauges and their consequent change in resistance is thus caused by rotation on the axle in relation to the vertical force P. The strain gauges have therefore been placed on the axle and connected to the circuit in a manner that compensates for the errors that normally evolve from the rotation of the axle forwardly or backwardly in the direction of the longitudinal incline.

It can be seen in FIGS. 3 and 4 that as the angle of inclination increases, or in other words, the angle $\theta$, that the resistance of $S_1$ increases while the resistance of $S_2$ decreases. Also, a similar relationship exists between $G_1$ and $G_2$ wherein the resistance of $G_1$ decreases and the resistance of $G_2$ increases as the angle of incline $\theta$ increases. The resistance of $S_2$ and $G_1$ decreases while the resistance of $S_1$ and $G_2$ decreases because of the rotation of the axle through the angle $\theta$ as shown.

The resistance of the combination of strain gauges S–1 and S–2 changes as a function of the cosine of $\theta$. The combination of strain gauges G–1 and G–2 also changes as a cosine function of $\theta$. When the two functions are added algebraically, the desired sum is K but the actual sum is K cosine $\theta$. As previously stated, $S_3$ has responded as a function of $K_2$/Sine $\theta$/. These two functions are summed by the circuitry and K and $K_2$ can be adjusted such that the sum is very nearly equal to K for substantial angles.

Lateral Loading Compensation

Looking more specifically at FIGS. 13 through 16, a mechanism 300 is shown. Mechanism 300 comprises a generally T-shaped section 302 having a transverse plate 304 and an upright plate 306. The transverse plate 304 is provided with openings 310 and 312 for receiving bolts 314 and 316. The upright portion 306 is bent away from the transverse portion 304. The transverse portions and upright portions, respectively 304 and 306, should be relatively rigid so that there is no displacement when the T-shaped plate 302 is under stress and in use.

A second plate 320 is shown in juxtaposition to the T plate 302 wherein a space 322 divides the two. The second plate 320 is provided with two openings 324 and 325 to secure it to the axle. As can be understood, the openings 310, 312, 324 and 325 can be substituted for any suitable attachment means such as welds, screws, or bolts. However, the criteria is that they be rigidly affixed thereto so that they can move with respect to each other upon stress related internal movement of the axle 10.

An L-shaped upright plate 326 is shown having a first portion 328 attached to the T and a second portion 330 attached to the plate which is on the top of the axle, namely plate 320. Between the L-shaped plate 328 and 330, a light metal stamping or bridging member or plate 230 is placed similar to that of the showings in FIGS. 11, 12, 14, and 15. The stamping 230 is fusion welded or connected in any other suitably fixed manner to the two respective L-plates 328 and 330. Across the bridging plate 230 a strain gauge G–3 is affixed and suitably connected to the circuit as previously indicated.

During either horizontal loading or longitudinally inclined loading, there is generally no relative movement between the two plates 302 and 320. The transverse portion of the T plate 302, namely portion 304, should be mounted approximately 90° from the top dead center on the axle when the axle and the load it supports is on a horizontal surface. That angle is generally shown as angle $\Psi$ in the showing of FIG. 13. The plate 320 should be generally mounted on top dead center as shown in FIG. 13 so that it is relatively horizontal when the axle is placed on a horizontal surface with respect to the load it is bearing.

As previously stated, during either horizontal loading or longitudinally inclined loading, there is no relative movement between plates 302 and 320. Thus, the strain gauge G–3 is not stressed. In contradistinction to the foregoing loadings, when a laterally inclined loading is taking place, there is relative lateral movement between the two plates 302 and 320. This movement is proportional to Sine of $\phi$, ie. $\Delta R = K$ Sine $\phi$/. When a lateral incline takes place, it can be appreciated that stresses develop within the axle so that a point on the top of the axle moves with respect to a point on the neutral axis and the bottom of the axle. Although the neutral axis does not effectively shift, the top and bottom portions of the axle shift.

In light of the foregoing, plate 320 moves to the left of plate 302 during left laterally inclined loading and to the right of plate 302 during lateral loading to the right. Furthermore, analysis of the mechanism shown in FIGS. 13 through 16 shows that the bridging plate 230 is subjected to the same bending moment during both left lateral and right lateral inclined loading. The change of resistance in the strain gauge is therefore proportional to the absolute value of the Sine $\phi$, ie., $\Delta R = K$ Sine $\phi$.

Lateral incline loading introduces an error that is proportional to the cosine of the angle of the incline. As has been stated, $\Delta R = K$ is the desired changed in strain gauge resistance with increased loading. The actual change due to lateral incline error is K Cos $\phi$, ie., $\Delta R = K$ Cos $\phi$. In effect, strain gauge G–3 adds $K_3$ Sine$\phi$ such that $\Delta R = K$ Cos $\phi + K_3$ Sine$\phi$. As before, K and $K_3$ can be adjusted such that $\Delta R$ is very nearly K for substantial lateral angles. Since the whole mechanical system is substantially linear, longitudinal and lateral effects may be added and the result is a linear sum of the two. In summation, the total incline error, both lateral and longitudinal, can be made negligible.

It should be emphasized that strain gauge S–3 on its special mechanism is generally mounted on the forward or loading side of the axle as seen in FIG. 11 which shows the direction. The special mechanism incorporating strain gauge G–3 is mounted on the trailing portion of the axle and is displaced from S–3 as shown in FIG. 13.

The foregoing description of the preferred embodiments is only for descriptive purposes. As can be appreciated, different angles can be utilized as to the placement of the strain gauges as long as they incorporate the teachings of this invention for lateral and horizontal displacement. Furthermore, other amplifiers and circuit conbinations can be utilized to balance the resistances and currents which are within the system.

We claim:

1. Apparatus for measuring the loading on an axle of a vehicle comprising:
   a. at least two strain gauges in displaced relationship along said axle;
   b. an electrical bridge circuit comprising four legs employing at least one of said strain gauges in a first leg in parallel relationship with a second of said strain gauges in a second leg;

c. each of said legs having two ends;

d. first ends of each of said legs containing strain gauges connected to each other and comprising a first common junction;

e. the other two legs of said bridge comprising means for maintaining a constant current through the legs having said strain gauges, first ends of each of said other two legs connected to each other and comprising a second common junction;

f. cross coupling circuit between the two legs comprising constant current means;

g. voltage supply connected across the first and second common junctions;

h. the second end of a first strain gauge leg and the second end of a first constant current means leg connected to each other and comprising a third common junction;

i. the second end of a second strain gauge leg and the second end of a second constant current means leg connected to each other and comprising a fourth common junction;

j. output means connected across said third and fourth common junctions to provide an indication of the weight in the vehicle.

2. The apparatus as claimed in claim 1 further comprising:

an amplifier connected across said bridge between said strain gauges.

3. The apparatus as claimed in claim 1 further comprising:

second and third amplifiers each connected to the constant current means to maintain the current through said strain gauges at a constant level.

4. The apparatus as claimed in claim 3 wherein:

said second and third amplifiers are operational amplifiers,

5. The apparatus as claimed in claim 3 wherein:

the output of said first amplifier is connected to a D'Arsonval movement calibrated to read the load on said axle; and, said strain gauges are angularly disoriented with respect to each other around the axis of said axle.

* * * * *